US007894343B2

(12) United States Patent
Chao et al.

(10) Patent No.: US 7,894,343 B2
(45) Date of Patent: Feb. 22, 2011

(54) PACKET SEQUENCE MAINTENANCE WITH LOAD BALANCING, AND HEAD-OF-LINE BLOCKING AVOIDANCE IN A SWITCH

(75) Inventors: Hung-Hsiang Jonathan Chao, Holmdel, NJ (US); Jinsoo Park, Leonia, NJ (US)

(73) Assignee: Polytechnic University, Brooklyn, NY (US)

( * ) Notice: Subject to any disclaimer, the term of this patent is extended or adjusted under 35 U.S.C. 154(b) by 1503 days.

(21) Appl. No.: 10/776,574

(22) Filed: Feb. 11, 2004

(65) Prior Publication Data

US 2005/0002334 A1 Jan. 6, 2005

Related U.S. Application Data

(60) Provisional application No. 60/479,733, filed on Jun. 19, 2003.

(51) Int. Cl.
*G01R 31/08* (2006.01)
(52) U.S. Cl. .................. 370/235; 370/394; 370/395.32
(58) Field of Classification Search ........................ None
See application file for complete search history.

(56) References Cited

U.S. PATENT DOCUMENTS

| 5,179,556 | A | | 1/1993 | Turner |
| 5,600,795 | A | | 2/1997 | Du ............................. 709/227 |
| 5,689,506 | A | | 11/1997 | Chiussi et al. ............... 370/388 |
| 5,724,351 | A | * | 3/1998 | Chao et al. .............. 370/395.42 |
| 5,864,539 | A | * | 1/1999 | Yin ............................. 370/236 |
| 6,047,000 | A | * | 4/2000 | Tsang et al. ................. 370/412 |
| 6,072,772 | A | * | 6/2000 | Charny et al. ................ 370/229 |
| 6,310,879 | B2 | | 10/2001 | Zhou et al. |
| 6,333,932 | B1 | | 12/2001 | Kobayasi et al. ............. 370/389 |
| 6,396,815 | B1 | | 5/2002 | Greaves et al. .............. 370/256 |
| 6,426,957 | B1 | | 7/2002 | Hauser et al. ................ 370/413 |
| 6,449,275 | B1 | | 9/2002 | Andersson et al. ........ 370/395.1 |
| 6,463,485 | B1 | | 10/2002 | Chui et al. |
| 6,504,820 | B1 | * | 1/2003 | Oliva .......................... 370/232 |

(Continued)

OTHER PUBLICATIONS

Cooperatve Association for Internet Data Analysis, www.CAIDA. org, downloaded 2008, 1 page.

(Continued)

*Primary Examiner*—Phirin Sam
(74) *Attorney, Agent, or Firm*—Woodcock Washburn LLP

(57) ABSTRACT

To avoid packet out-of-sequence problems, while providing good load balancing, each input port of a switch monitors the outstanding number of packets for each flow group. If there is an outstanding packet in the switch fabric, the following packets of the same flow group should follow the same path. If there is no outstanding packet of the same flow group in the switch fabric, the (first, and therefore subsequent) packets of the flow can choose a less congested path to improve load balancing performance without causing an out-of-sequence problem. To avoid HOL blocking without requiring too many queues, an input module may include two stages of buffers. The first buffer stage may be a virtual output queue (VOQ) and second buffer stage may be a virtual path queue (VPQ). At the first stage, the packets may be stored at the VOQs, and the HOL packet of each VOQ may be sent to the VPQ. By allowing each VOQ to send at most one packet to VPQ, HOL blocking can be mitigated dramatically.

39 Claims, 12 Drawing Sheets

U.S. PATENT DOCUMENTS

| | | | |
|---|---|---|---|
| 6,621,824 B1 * | 9/2003 | Lauffenburger et al. | 370/412 |
| 6,625,121 B1 * | 9/2003 | Lau et al. | 370/230 |
| 6,628,657 B1 | 9/2003 | Manchester et al. | 370/395.1 |
| 6,631,130 B1 | 10/2003 | Roy et al. | 370/352 |
| 6,819,675 B2 | 11/2004 | Benayoun et al. | |
| 6,870,831 B2 | 3/2005 | Hughes et al. | 370/352 |
| 6,920,156 B1 | 7/2005 | Manchester et al. | 370/522 |
| 6,959,002 B2 * | 10/2005 | Wynne et al. | 370/412 |
| 6,961,342 B1 * | 11/2005 | Uzun et al. | 370/414 |
| 6,973,092 B1 | 12/2005 | Zhou et al. | 370/412 |
| 7,016,365 B1 | 3/2006 | Grow et al. | |
| 7,042,842 B2 | 5/2006 | Paul et al. | |
| 7,050,448 B2 * | 5/2006 | Johnson et al. | 370/413 |
| 7,058,751 B2 * | 6/2006 | Kawarai et al. | 710/317 |
| 7,068,654 B1 * | 6/2006 | Joseph et al. | 370/392 |
| 7,068,672 B1 | 6/2006 | Jones | 370/412 |
| 7,126,918 B2 * | 10/2006 | Roberts | 370/235 |
| 7,136,356 B2 | 11/2006 | Suzuki et al. | |
| 7,142,553 B1 | 11/2006 | Ojard et al. | 370/421 |
| 7,145,873 B2 | 12/2006 | Luijten et al. | |
| 7,145,914 B2 | 12/2006 | Olarig et al. | |
| 7,154,885 B2 * | 12/2006 | Nong | 370/380 |
| 7,180,862 B2 * | 2/2007 | Peebles et al. | 370/235 |
| 7,248,586 B1 * | 7/2007 | Hughes et al. | 370/394 |
| 7,366,165 B2 * | 4/2008 | Kawarai et al. | 370/366 |
| 7,443,851 B2 | 10/2008 | Fukushima et al. | |
| 7,453,801 B2 | 11/2008 | Taneja et al. | |
| 7,464,180 B1 * | 12/2008 | Jacobs et al. | 709/240 |
| 7,486,678 B1 * | 2/2009 | Devanagondi et al. | 370/394 |
| 7,519,065 B2 * | 4/2009 | Angle et al. | 370/395.4 |
| 7,545,801 B2 | 6/2009 | Miller, Jr. et al. | |
| 2002/0031087 A1 * | 3/2002 | Gotoh et al. | 370/231 |
| 2002/0054567 A1 * | 5/2002 | Fan | 370/230 |
| 2002/0085578 A1 | 7/2002 | Dell et al. | 370/422 |
| 2002/0099900 A1 * | 7/2002 | Kawarai et al. | 710/317 |
| 2002/0131412 A1 * | 9/2002 | Shah et al. | 370/390 |
| 2002/0136163 A1 * | 9/2002 | Kawakami et al. | 370/229 |
| 2002/0191588 A1 | 12/2002 | Personick | 370/352 |
| 2003/0099194 A1 * | 5/2003 | Lee et al. | 370/229 |
| 2003/0118052 A1 | 6/2003 | Kuhl et al. | 370/474 |
| 2003/0123468 A1 * | 7/2003 | Nong | 370/412 |
| 2003/0126297 A1 | 7/2003 | Olarig et al. | |
| 2003/0179774 A1 | 9/2003 | Saidi et al. | 370/468 |
| 2003/0218980 A1 | 11/2003 | Fukushima et al. | |
| 2003/0223424 A1 * | 12/2003 | Anderson et al. | 370/392 |
| 2003/0227906 A1 | 12/2003 | Hallman | |
| 2004/0013124 A1 * | 1/2004 | Peebles et al. | 370/412 |
| 2004/0037313 A1 | 2/2004 | Gulati et al. | 370/465 |
| 2004/0151197 A1 * | 8/2004 | Hui | 370/412 |
| 2004/0213156 A1 * | 10/2004 | Smallwood et al. | 370/232 |
| 2004/0246977 A1 * | 12/2004 | Dove et al. | 370/395.61 |
| 2005/0002410 A1 | 1/2005 | Chao | 370/412 |
| 2005/0025141 A1 | 2/2005 | Chao | 370/412 |
| 2005/0025171 A1 | 2/2005 | Chao | 370/432 |
| 2005/0201314 A1 | 9/2005 | Hirano | |
| 2006/0203725 A1 | 9/2006 | Paul et al. | |
| 2006/0239259 A1 | 10/2006 | Norman et al. | |
| 2008/0069125 A1 | 3/2008 | Reed et al. | |
| 2009/0028152 A1 * | 1/2009 | Shimonishi | 370/392 |

OTHER PUBLICATIONS

United States Patent and Trademark Office: Non-final Office Action dated Jul. 16, 2007, U.S. Appl. No. 10/776,575, 8 pages.
United States Patent and Trademark Office: Non-final Office Action dated Sep. 4, 2007, U.S. Appl. No. 10/872,187, 6 pages.
United States Patent and Trademark Office: Final Office Action dated Feb. 12, 2008, U.S. Appl. No. 10/872,187, 8 pages.
United States Patent and Trademark Office: Non-Final Office Action dated Sep. 18, 2007, U.S. Appl. No. 10/872,332.
United States Patent and Trademark Office: Non-Final Office Action dated Feb. 13, 2008, U.S. Appl. No. 10/872,332.
United States Patent and Trademark Office: Notice of Allowance dated Mar. 14, 2008, U.S. Appl. No. 10/776,575.
United States Patent and Trademark Office: Non-Final Office Action dated Jul. 9, 2008, U.S. Appl. No. 10/872,187.
United States Patent and Trademark Office: Final Office Action dated Oct. 23, 2008, U.S. Appl. No. 10/872,332.
United States Patent and Trademark Office: Final Office Action dated Feb. 4, 2009, U.S. Appl. No. 10/872,187.
United States Patent and Trademark Office: Non-Final Office Action dated Apr. 1, 2009, U.S. Appl. No. 10/872,332.
United States Patent and Trademark Office: Notice of Allowance dated Jun. 16, 2009, U.S. Appl. No. 10/776,575.
United States Patent and Trademark Office: Non-Final Office Action dated Jul. 14, 2009, U.S. Appl. No. 10/872,187.
United States Patent and Trademark Office: Notice of Allowance dated Jan. 8, 2010, U.S. Appl. No. 10/872,187.
United States Patent and Trademark Office: Non-Final Office Action dated Oct. 8, 2009, U.S. Appl. No. 10/776,575.
United States Patent and Trademark Office: Notice of Allowance dated Nov. 16, 2009, U.S. Appl. No. 10/872,332.

* cited by examiner

PACKET SEQUENCE MAINTENANCE WITH LOAD BALANCING, AND HEAD-OF-LINE BLOCKING AVOIDANCE IN A SWITCH

RELATED APPLICATIONS

This application claims benefit to U.S. Provisional Application Ser. No. 60/479,733, titled "A HIGHLY SCALABLE MULTI-PLANE MULTI-STAGE BUFFERED PACKET SWITCH," filed on Jun. 19, 2003, and listing H. Jonathan Chao and Jinsoo Park as inventors (referred to as "the '733 provisional"). That application is incorporated herein by reference. The scope of the present invention is not limited to any requirements of the specific embodiments described in that application.

FEDERAL FUNDING

This invention was made with Government support and the Government may have certain rights in the invention as provided for by grant number ANI-9906673 by the National Science Foundation.

§1. BACKGROUND OF THE INVENTION

§1.1 Field of the Invention

The present invention concerns communications. In particular, the present invention concerns maintaining packet sequence with load balancing, and avoiding head-of-line (HOL) blocking in large scale switches used in communications networks.

§1.2 Related Art

To keep pace with Internet traffic growth, researchers continually explore transmission and switching technologies. For instance, it has been demonstrated that hundreds of signals can be multiplexed onto a single fiber with a total transmission capacity of over 3 Tbps and an optical cross-connect system (OXC) can have a total switching capacity of over 2 Pbps. However, the capacity of today's (Year 2003) core Internet Protocol (IP) routers remains at a few hundred Gbps, or a couple Tbps in the near future.

It still remains a challenge to build a very large IP router with a capacity of tens Tbps or more. The complexity and cost of building such a large-capacity router is much higher than building an optical cross connect system (OXC). This is because packet switching may require processing (e.g., classification and table lookup), storing, and scheduling packets, and performing buffer management. As the line rate increases, the processing and scheduling time available for each packet is proportionally reduced. Also, as the router capacity increases, the time for resolving output contention becomes more constrained.

Demands on memory and interconnection technologies are especially high when building a large-capacity packet switch. Memory technology very often becomes a bottleneck of a packet switch system. Interconnection technology significantly affects a system's power consumption and cost. As a result, designing a good switch architecture that is both scalable to handle a very large capacity and cost-effective remains a challenge.

The numbers of switch elements and interconnections are often critical to the switch's scalability and cost. Since the number of switch elements of single-stage switches is proportional to the square of the number of switch ports, single-stage architecture is not attractive for large switches. On the other hand, multi-stage switch architectures, such as a Clos network type switch, is more scalable and requires fewer switch elements and interconnections, and is therefore more cost-effective.

FIG. 1 shows a core router (CR) architecture 100 which includes line cards 110, 120 a switch fabric 130, and a route controller (not shown) for executing routing protocols, maintenance, etc. The router 100 has up to N ports and each port has one line card. (Note though that some switches have ports that multiplex traffic from multiple input line cards at the ingress and de-multiplexes the traffic from the switch fabric to multiple line cards at the egress.) A switch fabric 130 usually includes multiple switch planes 140 (e.g., up to p in the example of FIG. 1) to accommodate high-speed ports.

A line card 110, 120 usually includes ingress and/or egress functions and may include one or more of a transponder (TP) 112, 122, a framer (FR) 114, 124, a network processor (NP) 116, 126, and a traffic manager (TM) 118, 128. A TP 112, 122 may be used to perform optical-to-electrical signal conversion and serial-to-parallel conversion at the ingress side. At the egress side, it 112, 122 may be used to perform parallel-to-serial conversion and electrical-to-optical signal conversion. An FR 114, 124 may be used to perform synchronization, frame overhead processing, and cell or packet delineation. An NP 116, 126 may be used to perform forwarding table lookup and packet classification. Finally, a TM 118, 128 may be used to store packets and perform buffer management, packet scheduling, and any other functions performed by the router architecture (e.g., distribution of cells or packets in a switching fabric with multiple planes).

Switch fabric 130 may be used to deliver packets from an input port to a single output port for unicast traffic, and to multiple output ports for multicast traffic.

When a packet arrives at CR 100, it determines an outgoing line to which the packet is to be transmitted. Variable length packets may be segmented into fixed-length data units, called "cells" without loss of generality, when entering CR 100. The cells may be re-assembled into packets before they leave CR 100. Packet segmentation and reassembly is usually performed by NP 116, 126 and/or TM 118, 128.

FIG. 2 illustrates a multi-plane multi-stage packet switch architecture 200. The switch fabric 230 may include p switch planes 240. In this exemplary architecture 200, each plane 240 is a three-stage Benes network. Modules in the first, second, and third stages are denoted as Input Module (IM) 242, Center Module (CM) 244, and Output Module (OM) 246. IM 242, CM 244, and OM 246 have many common features and may be referred to generally as a Switch Module (SM).

Traffic enters the switch 200 via an ingress traffic manager (TMI) 210 and leaves the switch 200 via an egress traffic manager (TME) 220. The TMI 210 and TME 220 can be integrated on a single chip. Therefore, the number of TM chips may be the same as the number of ports (denoted as N) in the system 200. Cells passing through the switch 200 via different paths may experience different queuing delays. These different delays may result in cells arriving at a TME 220 out of sequence. However, if packets belonging to the same flow traverse the switch via the same path (i.e., the same switch plane and the same CM) until they have all left the switch fabric, there should be no cell out-of-sequence problem. FIG. 2 illustrates multiple paths between TMI(0) 210a and TME(0) 220a. The TMI 210 may determine the path ID (PID) of each flow using a flow ID (FID). The PID may correspond to a switch fabric plane 240 number and a CM 244 number in the plane 240.

In the embodiment 200 illustrated in FIG. 2, the first stage of a switch plane 240 includes k IMs 242, each of which has n inputs and m outputs. The second stage includes m CMs 244, each of which has k inputs and k outputs. The third stage includes k OMs 246, each of which has m inputs and n outputs. If n, m, and k are equal to each other, the three modules 242, 244, 246 may have identical structures.

From the TMI 210 to the TME 220, a cell traverses four internal links: (i) a first link from a TMI 210 to an IM 242; (ii) a second link from the IM 242 to a CM 244; (iii) a third link from the CM 244 to an OM 246; and (iv) a fourth link from the OM 246 to a TME 220.

In such a switch 200, as well as other switches, a number of issues may need to be considered. Such issues may include maintaining packet sequence, load balancing and HOL blocking. Section 1.2.1 discusses packet out-of-sequence and load balancing problems. Section 1.2.2 discusses the problem of HOL blocking.

§1.2.1 Packet Out-Of-Sequence and Load Balancing

A switch fabric cross-connects packets from an input port (i.e., packet arriving port) to an output port (i.e., packet departing port) at very high speed (e.g., new configuration in every 200 nsec). One requirement, or at least an important feature, of a switch fabric is that packets belonging to the same flow be delivered in order. A flow refers to a virtual connection from a source end system to a destination end system. In other words, a flow is a stream of data traveling across a network between two endpoints. An example of a flow is a stream of packets traveling between two computers that have established a TCP connection. If packets belong to the same flow are not delivered in order through the switch fabric, the switch fabric is assumed to have a packet out-of-sequence problem. Although some applications may be tolerant of packet out-of-sequence problems, it is desirable to avoid such problems.

A switch fabric can be classified as one of (a) a single-path switch fabric, or (b) a multi-path switch fabric. A single-path switch fabric has only one path for a given input port-output port pair. A single-path switch fabric avoids packet out-of-sequence problems because all packets of a flow arriving at a given input port take the same path through the switch. However, a single-path switch fabric may not be scalable to meet the increasing demand of the Internet traffic.

A multi-path switch fabric, such as the one 230 illustrated in FIG. 2 for example, has more than one path for an input port-output port pair. A multi-path switch fabric can be further classified as either (a) a memory-less switch fabric, or (b) a buffered switch fabric. A memory-less switch fabric does not store packets in the switch fabric. Therefore, a memory-less multi-path switch fabric should have no packet out-of-sequence problems, or at least no severe packet out-of-sequence problems, because the propagation delays through different paths are comparable. However, for a switch fabric to be memory-less, the potential for contention among packets destined for the same output link must be resolved before the packet enters the switch fabric. Unfortunately, this could be a complicated process.

A buffered multi-path switch fabric may have a packet out-of-sequence problem because packets sent to different paths may experience different queuing delays due to the output link contentions. Two known techniques for solving this problems, as well as shortcomings of these known techniques, are introduced in §1.2.1.1 below.

§1.2.1.1 Previous Approaches to Solve Packet Out-Of-Sequence Problems in Buffered Multi-Path Switch Fabrics, and Limitations of Such Approaches Two methods have been proposed to solve the packet out-of-sequence problem in the buffered multi-path switch fabric. The first method re-sequences packets at the output port. The packet re-sequencing may require several conditions. First, each packet should carry a sequence number. One exemplary sequence number is a time-stamp based on the arrival time of the packet at the input port. If the sequence number is large, the overhead ratio (of sequence number size to cell or packet size) can be too big to be practical. A high overhead ratio can cause increased implementation costs, performance degradation due to reduced internal speedup, or both. Second, the degree of packet out-of-sequence should be bounded to ensure successful re-sequencing. Since Internet traffic is very complicated, it is difficult to estimate the degree of packet out-of-sequence that will occur. Even when the degree of packet out-of-sequence is bounded, implementing the re-sequencing circuits increases costs.

The second method to solve the packet out-of-sequence problem is to send all packets belong to the same flow over the same path. This emulates a single-path switch fabric for a given flow, thus avoiding packet out-of-sequence problems altogether. This idea is attractive in the sense that the packet out-of-sequence problem is only matters for the packets belong to the same flow. This scheme is referred to as "static hashing." Static hashing advantageously eliminates the re-sequencing buffer at the output port. Since packets belonging to the same flow take the same path in the multi-path switch fabric, they will arrive at the output port in the proper sequence.

Note that re-sequencing is different from re-assembly. Re-sequencing is a term used to describe an operation to correct the situation when packets belonging to the same flow arrive at the output port out-of-sequence. Re-assembly is a term used to describe reconstituting packets when the packets are segmented into cells and are interleaved in the switch fabric. For purposes of this discussion, it is assumed that packets are not interleaved in the switch fabric. In other words, all cells belonging to the same packet will be sent back-to-back, without any intervening cells. Therefore, with static hashing, the output port has no re-sequencing buffer, nor does it have a re-assembly buffer.

One problem of the static hashing scheme is the potential for load imbalance. Since each flow may have different bandwidth, it is possible that one path will be more congested than another path, or other paths. This may complicate choosing proper paths to route packets from an input port to an output port. If paths are not properly chosen, the probability of congesting one path increases, adversely impacting switch performance.

To summarize, since a multi-path buffered packet switch has multiple paths from an input port, to an output port, there can be packet out-of-sequence problems. If packets of the same flow take the same path (as in static hashing), the packet order is maintained. However, the load on each path might not be balanced. On the other hand, if packets of the same flow take different paths, there can be an out-of-sequence problem between packets. One way to overcome this problem is to have a re-sequence buffer at the egress line card. However, adding resequencing functionality adds costs, and in a large system, the degree of out-of-sequence could be too large to re-sequence. In view of the foregoing, improved techniques for maintaining packet sequence in switches is desired.

§1.2.2 HOL Blocking

If one queue contains cells with different destinations, there can be a head-of-line (HOL) blocking problem. That is, an HOL cell losing arbitration for a contested output port can block cells behind of it, even if those cells are destined for an idle (uncontested) output port.

§1.2.2.1 Previous Approaches to Solve HOL Blocking and Limitations of Such Approaches The following example focuses on packets at an input port of a multi-plane multi-stage switch fabric, such as that 200 of FIG. 2, and serves to illustrate the limits of using general queues, virtual path queues (VPQs) and virtual output queues (VOQs) to eliminate the possibility of HOL blocking. Packets arriving at the switch can be destined for any output port, they can have any class of service, and they can be routed through any path in the switch fabric. Therefore, the number of queues required to ensure that HOL blocking is completely eliminated is equal to the switch size (i.e., the number of output ports), multiplied by the number of scheduling priorities (i.e., the number of different classes of service supported by the switch), and further multiplied by the number of possible paths for an {input port, output port} pair. In this example, the number of queues required would be $q*p*m*n*k$.

Unfortunately, if a switch fabric has a large number of paths for an {input port, output port} pair, the number of required queues at the input port may be too large to be practical. Recall that in the multi-plane multi-stage switch fabric shown in FIG. 2, the required number of queues necessary to completely eliminate the possibility of HOL blocking is $p*q*n*k*m$. Thus, for example, if $p=8$, $q=2$, $n=m=k=64$, then the required number of queues becomes 4 million, which may be too large for a practical implementation.

If it is assumed that the input port has only queues corresponding to the output ports and the scheduling priority (i.e., if it is assumed that the input port has a virtual output queue (VOQ) structure), packets routed to different paths can be stored at the same VOQ. Therefore, if the HOL packet is routed to a congested path, the HOL packet will block the packets behind of it and prevent them from entering the switch fabric. Consequently, packets routed to another path that is idle can be blocked by the HOL packet routed to the congested path. This HOL blocking degrades the system throughput.

If, on the other hand, it is assumed that the input port has only queues corresponding to the path and the scheduling priority (i.e., if it is assumed that the input port has a virtual path queue (VPQ) structure), packets destined for different output ports can be stored at the same VPQ. If the HOL packet is destined for a "hot spot" output port and the HOL packet loses a contention, the HOL packet will block the packets behind of it and prevent them from entering the switch fabric. Consequently, packets destined for other ports that are idle can be blocked by the HOL packet destined for the hot spot output port. This HOL blocking degrades system throughput.

In view of the foregoing, improved techniques for avoiding HOL blocking, that don't require too many queues are needed.

§2. SUMMARY OF THE INVENTION

To avoid packet out-of-sequence problems, while providing good load balancing, the present invention may use a dynamic hashing technique. In one embodiment, each input port monitors the outstanding number of packets for each flow group. If there is an outstanding packet in the switch fabric, the following packets of the same flow group should follow the same path. If there is no outstanding packet of the same flow group in the switch fabric, the (first, and therefore subsequent) packets of the flow can choose a less congested path to improve load balancing performance without causing an out-of-sequence problem.

One embodiment of the present invention implements dynamic hashing by modifying the input port. This embodiment of dynamic hashing may require the input port to maintain a table so that the packets belong to the same flow group can take the same path. If the number of flow groups is large, the table size should be large too. The look-up table may use content addressable memory (CAM).

A refined embodiment of the present invention may reduce the memory size requirements for the table by hashing the flow into one of a number of flow groups in order to reduce the memory size.

To avoid HOL blocking without requiring too many queues, the present invention may provide a TMI having two stages of buffers. The first buffer stage may be a virtual output queue (VOQ) and second buffer stage may be a virtual path queue (VPQ). At the first stage, the packets may be stored at the VOQs, and the HOL packet of each VOQ may be sent to the VPQ. The number of VPQs is equal to the number of paths in the switch fabric, multiplied by the number of scheduling priorities. Since each VOQ can send at most one packet to the VPQ, the total number of packets at all VPQs should be equal to or less than the number of VOQs. By allowing each VOQ to send at most one packet to VPQ, HOL blocking can be mitigated dramatically.

§3. BRIEF DESCRIPTION OF THE DRAWINGS

§4. DETAILED DESCRIPTION

Figure 1:
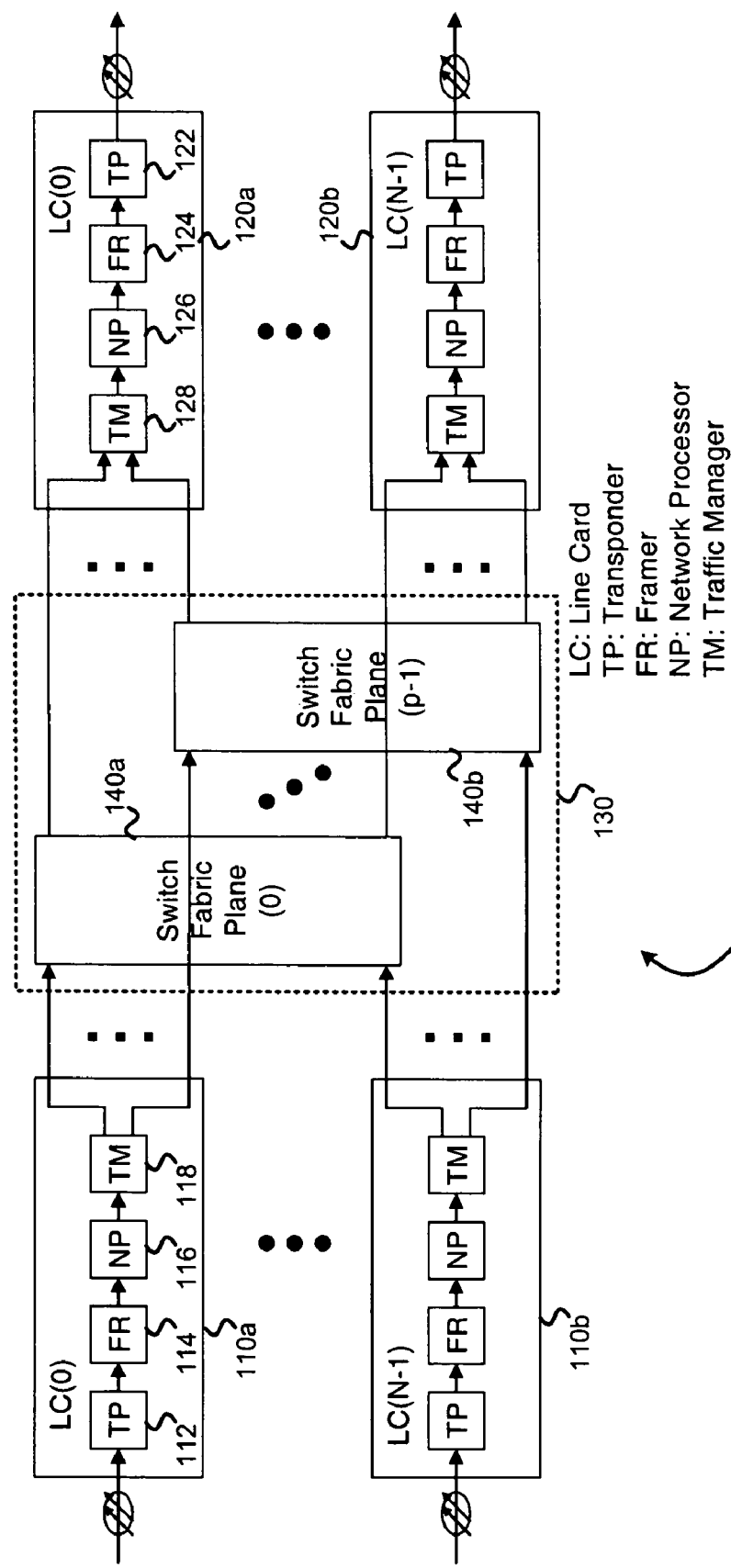
FIG. 1 is a block diagram of an exemplary switch environment in which, or with which, the present invention may be used.
Figure 2:
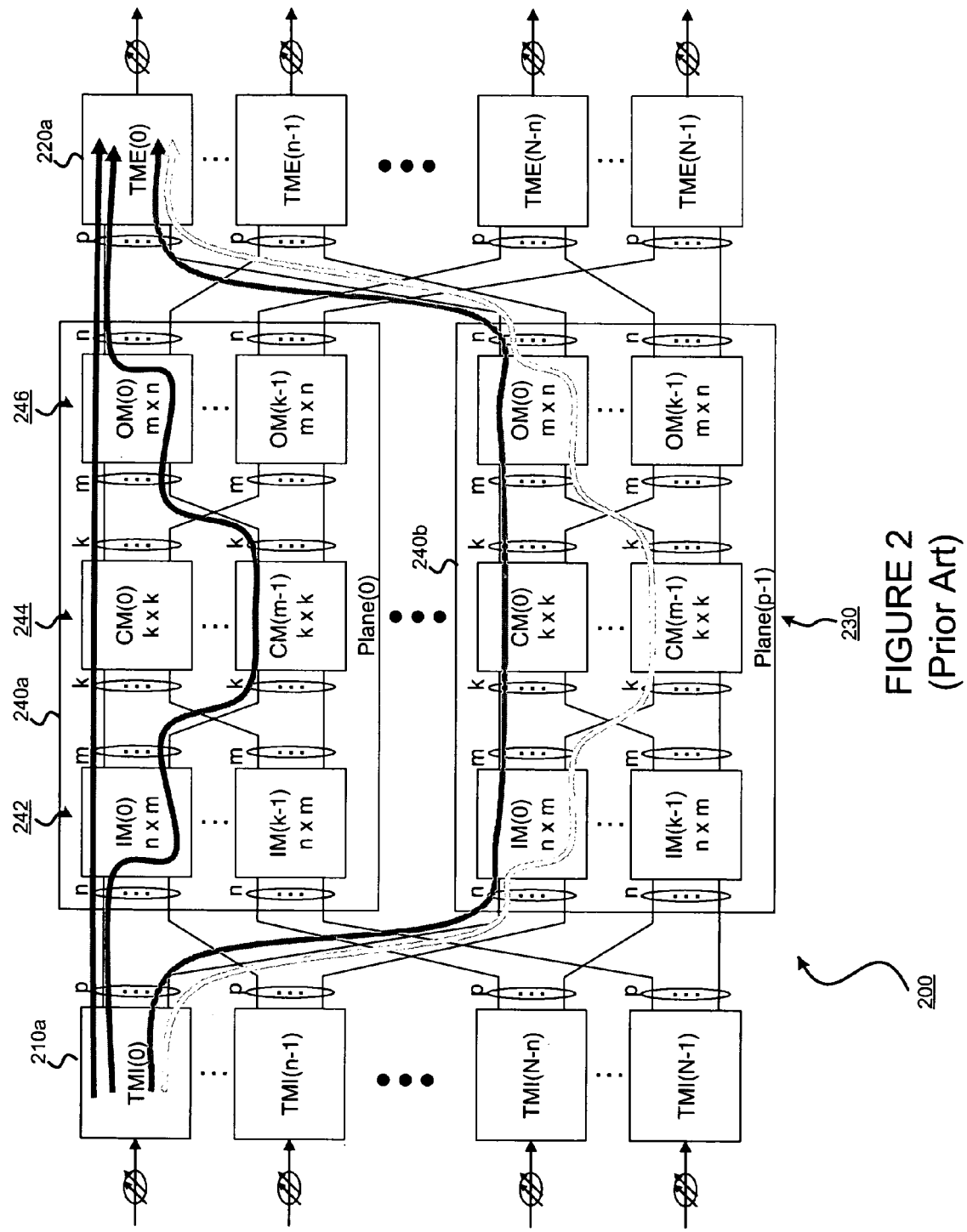
FIG. 2 illustrates alternative paths for a given {input port, output port} pair through a multi-stage switch.

The present invention may involve novel methods, apparatus, message formats and/or data structures for avoiding packet re-sequencing with a reasonable number of buffers, while permitting load balancing, and/or for avoiding HOL blocking. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as any patentable subject matter described.

In the following, abbreviations and letter symbols used in the specification are introduced in §4.1. Then, exemplary embodiments of the present invention are described in §4.2. Finally, some alternatives of the present invention are set forth in §4.3.

§4.1 Abbreviations

The following letter symbols are used in the specification.
N: switch size, which is number of ports in the system (N=n*k)
M: buffer size
n: module size, which is the number of inputs at the IM or the number of outputs at the OM
m: number of CMs
k: number of IMs/OMs
p: number of planes
q: number of scheduling priorities
u: hot spot probability
v: heavy flow probability
l: average packet size in cells
d1: distance between the TM and IM/OM in units of cell slot
d2: distance between the IM/OM and CM in units of cell slot
f1: number of normal flows (e.g., 100,000)
f2: number of heavy flows (e.g., 10)
Q_sm: Queue size in SM (e.g., 15)
B_sm: Buffer size in SM (e.g., 32)
Q_voq: VOQ size in TMI (e.g., 1023 cells)
Q_raq: RAQ size in TME (e.g., 255 cells)
B_tmi: Buffer size in TMI (e.g., 2 million cells)
B_tme: Buffer size in TME (e.g., 2 million cells)

The following abbreviations are used in the specification.
AP: Acknowledgement Period
ASIC: Application Specific Integrated Circuit
ATM: Asynchronous Transfer Mode
BOC: Buffer Outstanding Cell counter
BOP: Beginning Of Packet cell
BRC: Buffer Reserved Cell counter
CAM: Content Addressable Memory
CI: Cell Interleaving
CM: Center Module
COP: Continue Of Packet
CPI: Complete Packet Interleaving
COSQ: Class Of Service Queue
CR: Core Router
CRC: Cyclic Redundancy Check
CRT: CRediT update
CTYPE: Cell TYPE
DEST: DESTination
DPI: Dynamic Packet Interleaving
DQ: Destination Queue
DQC: DQ Counter
DQF: DQ Flag
EOP: End Of Packet
FGID: Flow Group ID
FID: Flow ID
FIFO: First In First Out queue
FR: FRamer
Gbps: Giga bits per second (i.e., $10^9$ bps)
HEC: Header Error detection and Correction
HOL: Head Of Line
ID: IDentification
IM: Input Module
IP: Internet Protocol
LC: Line Card
LOC: Link Outstanding Cell
Mbits: Mega bits
MHQ: Multicast High-priority Queue
MLQ: Multicast Low-priority Queue
MPLS: Multi-Protocol Label Switching
MRC: Maximum number of Reserved Cells
NP: Network Processor
OM: Output Module
OPC: Outstanding Packet Counter
OXC: Optical Cross-connect System
PACK: Packet ACKnowledgment
Pbps: Peta bits per second (i.e., 1015 bps)
PID: Path ID
POS: Packet Over SONET
PPI: Partial Packet Interleaving
QOC: Queue Outstanding Cell counter
QRC: Queue Reserved Cell counter
RAQ: ReAssembly Queue
ROC: RTT Outstanding Cell counter
RR: Round Robin
RTT: Round-Trip Time
SCP: Single Cell Packet cell
SM: Switch Module
SQ: Source Queue
Tbps: Tera bits per second (i.e., 1012 bps)
TM: Traffic Manager module
TMI: Ingress TM
TME: Egress TM
TP: TransPonder
TS: Time Slot
UHQ: Unicast High-priority Queue
ULQ: Unicast Low-priority Queue
VC: Virtual Clock
VOQ: Virtual Output Queue
VPQ: Virtual Path Queue
WFQ: Weighted Fair Queuing
WRED: Weighted Random Early Discard
WRR: Weighted Round Robin

§4.2 Exemplary Embodiments

Exemplary embodiments for avoiding packet re-sequencing with a reasonable number of buffers, while permitting load balancing, are described in §4.2.1. Then, exemplary embodiments for avoiding HOL blocking are described in §4.2.2.

§4.2.1 Dynamic Hashing

The present invention may use the dynamic hashing techniques described in this section to avoid packet re-sequencing with a reasonable number of buffers, while permitting load balancing. Consistent with the present invention, dynamic hashing may be implemented as follows.

Each TMI 210 may keep track of the number of outstanding packets in the switch fabric 230. The TMI may do so by associating a flow group identifier (FGID) with an outstanding packet counter (OPC). That is, the OPC indicates the outstanding number of packets in the switch fabric 230 associated with the FGID from an input port. The OPC may be incremented by one whenever a new packet belonging to the FGID is sent to switch fabric 230. (Generally speaking, the switch fabric 230 includes only IM 242, CM 244, and OM 246. However, the OPC may actually count the number of packets in a virtual path queue (VPQ) at TMI 210 and at a reassembly queue (RAQ) at TME 220, in addition to those at IM 242, CM 244, and OM 246.) The OPC may be decremented by one whenever the TMI 210 receives a packet acknowledgment (PACK) with the FGID from the output port. The output port may send a PACK whenever it receives a new packet. The count increment and decrement amounts, with less resolution, can be for more than one packet. For example, the count can be incremented/decremented by one (or some other number, such as five for example) for every five packets.

Figure 3:
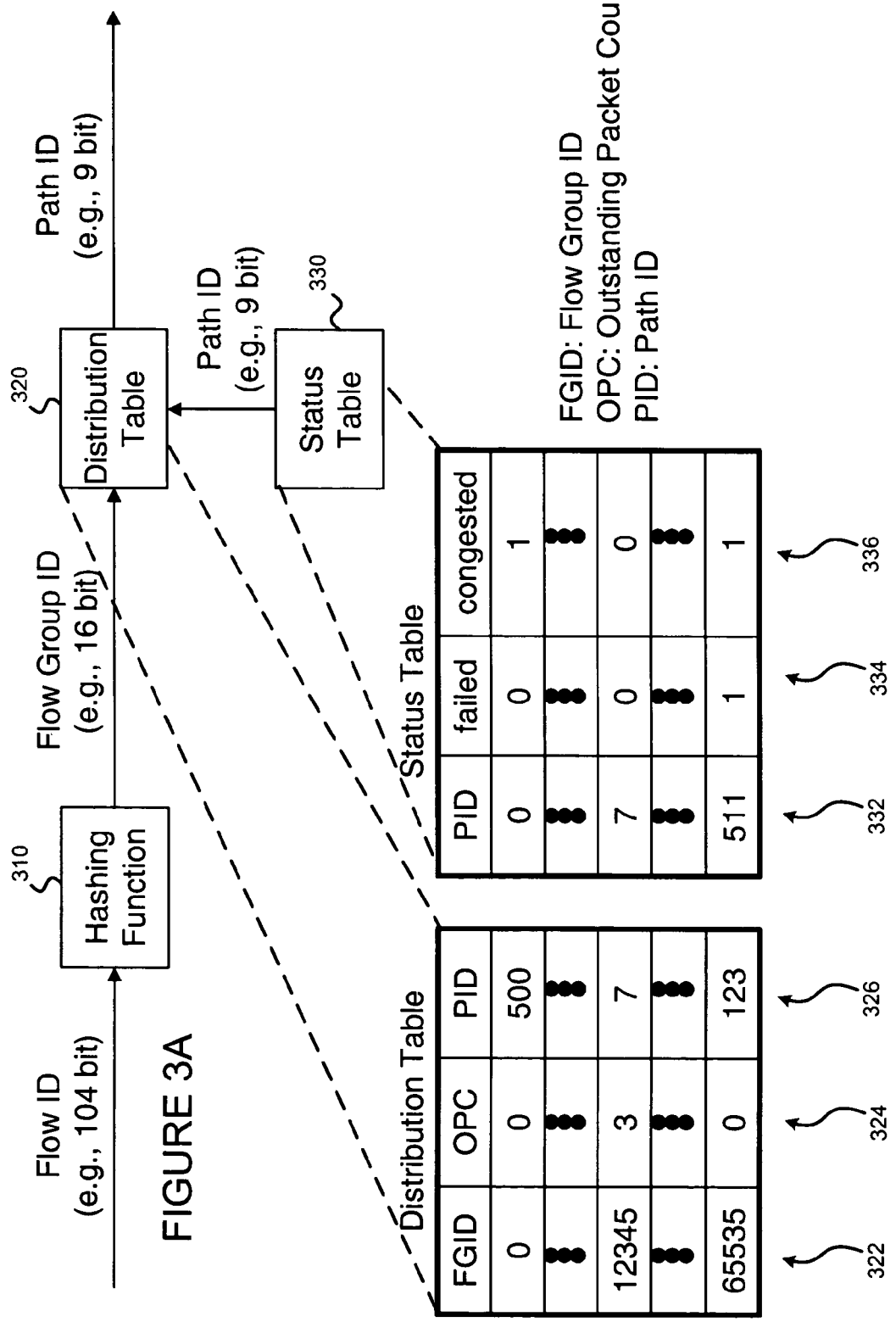
FIGS. 3A-3C illustrate exemplary distribution and status information and tables that may be used to perform a dynamic hashing operation in a manner consistent with the present invention.

As illustrated in FIG. 3A, the input port may include means for performing a hashing function and may maintain two tables—a distribution table 320 and a status table 330. The utility of the hashing function is now described. In high-speed core networks, one high-speed link (e.g., OC-192c) may carry a large number of flows (e.g., 400,000 flows). A flow can be uniquely identified by a 5-part flow identifier (FID) including a source IP address (32 bits), a destination IP address (32 bits), a source port number (16 bits), a destination port number (16 bits), and a protocol number (8 bits). If each TMI was to maintain a distribution table for all possible flows, the size of the distribution table should be 2104 (because the FID is assumed to have a 104 bit address). Unfortunately, this may be too big to be practical. Therefore, it may be desirable to reduce the number of flows maintained in the TMI. One technique is to convert the 104-bit FID into a smaller (e.g., 16-bit) Flow Group ID (FGID) using a hashing function, such as CRC-16. In this case, it is possible more than one flow to have the same FGID. This hashing technique is well studied in the literature and the CRC scheme is known to have a good performance. Other schemes, such as simply ignoring some bits of the FID may be used. The present invention may use one of various hashing functions, such as cyclic redundancy checking (CRC) polynomials, Fletcher checksum, folding of address octets using the exclusive-OR operation, and bit extraction from the address. In the embodiment of the present invention that uses CRC-16 to hash a flow into a flow group, any flow can be translated into one of the 65,536 flow groups and the table size will be reduced to a few hundred Kbytes.

Although static hashing has been used to group flows into flow groups, the present invention advantageously avoids the problem of uneven bandwidth distribution. For example, suppose in the multi-plane multi-stage switch architecture 200 described above, the number of paths (e.g., 512) is the product of the number of planes (e.g., 8) 230 and the number of CMs (e.g., 64) 244, which is much smaller than the number of FGIDs (i.e., $2^{16}$=65536). Therefore, the FGID may be mapped to a path identifier (PID). Static hashing may perform this mapping simply by dividing the FGID by the number of paths, and using the remainder as the PID. For example, if the FGID is 33,333 and the number of paths is 512, the PID becomes 53. Then all the packets with the FGID of 33,333 will be routed through the first plane (i.e., PLA=0) and the 53th CM (i.e., CMA=53). Unfortunately, as mentioned above, static hashing can lead to uneven bandwidth distribution among the paths, particularly if the flow bandwidth has a large deviation.

Referring back to FIG. 3A, recall that the input port may include a distribution table 320 and a status table 330. As shown in FIG. 3B, an exemplary distribution table 320' may include a number of entries, each entry including a field for a path ID (PID) 326 and the OPC 324 associated with each FGID 322. If the hashing function 310 uses CRC-16 to generate a FGID from a flow identifier (FID), the size of the distribution table 330' is 1 Mbit (i.e., $2^{16}$*16 bits). More specifically, the address field may be 16 bits so that there is one address for each FGID, the PID field may be 9 bits (i.e., 3-bits for the eight (8) switch fabric planes 240 and 6-bits for the 64 CMs 244 per switch plane 240), and the OPC field may be 7 bits (It is assumed that the maximum number of packets unacknowledged on a path is 128 in view of the following. The unacknowledged packets can be stored at VPQ at TMI 210, IM 242, CM 244, OM 246, and RAQ at TME 220. The queue sizes of IM 242, CM 244, and OM 246 are assumed to be 15 cells. If all cells are SCP, the number of packets on a path is the same as the number of cells on that path. Although the VPQ can store up 4096 packets in the worst case, it is unlikely). Conventional memory can be used for the distribution table 320'. If the hashing function 310 uses CRC-32 to generate a FGID from the FID, the memory size may become too large (i.e., $2^{32}$*16 bit=64 Gbit). State-of-the-art chip technology can have up to a few Mbits on-chip memory, so 64 Gbit is too big for the single on-chip memory. If the memory is external, the size can grow up to a few Gbits. However, such an embodiment is feasible nonetheless. For example, distribution table 330 could use content addressable memory (CAM) in such an embodiment.

The path identifier (PID) 326 in the distribution table 320 is valid while the OPC 324 is greater than 0. If the OPC 324 reaches 0, a new PID 326 may be assigned to the FGID 322. Note that the use of the same PID need not be precluded. This is because if the OPC 324 becomes 0, the FGID 322 can be assigned to a different path from the previous path without having a packet out-of-sequence problem. This could be helpful for path congestion because if the OPC 324 is equal to 0, then packets of the flow do not need to take the previous path. This scheme is called "dynamic hashing."

Referring to FIG. 3C, in one embodiment, the status table 330' maintains two flags for each PID 332. One flag 334 is used to indicate whether the path is failed or not (e.g., due to a link failure, a chip failure, etc.). As will become apparent from the discussion below, if this flag 334 is set, no packets should be sent over the failed path identified by PID 332. The other flag 336 is used to indicate if the path is congested or not. To set this flag 336, the input port may use feedback information from the switch fabric 230.

If multiple scheduling priorities are to be supported, separate paths for each scheduling priority may be provided. Since there is no overlap between different scheduling priorities, the dynamic hashing techniques used for the single scheduling priority case can be applied to the multiple scheduling priorities.

Figure 4:
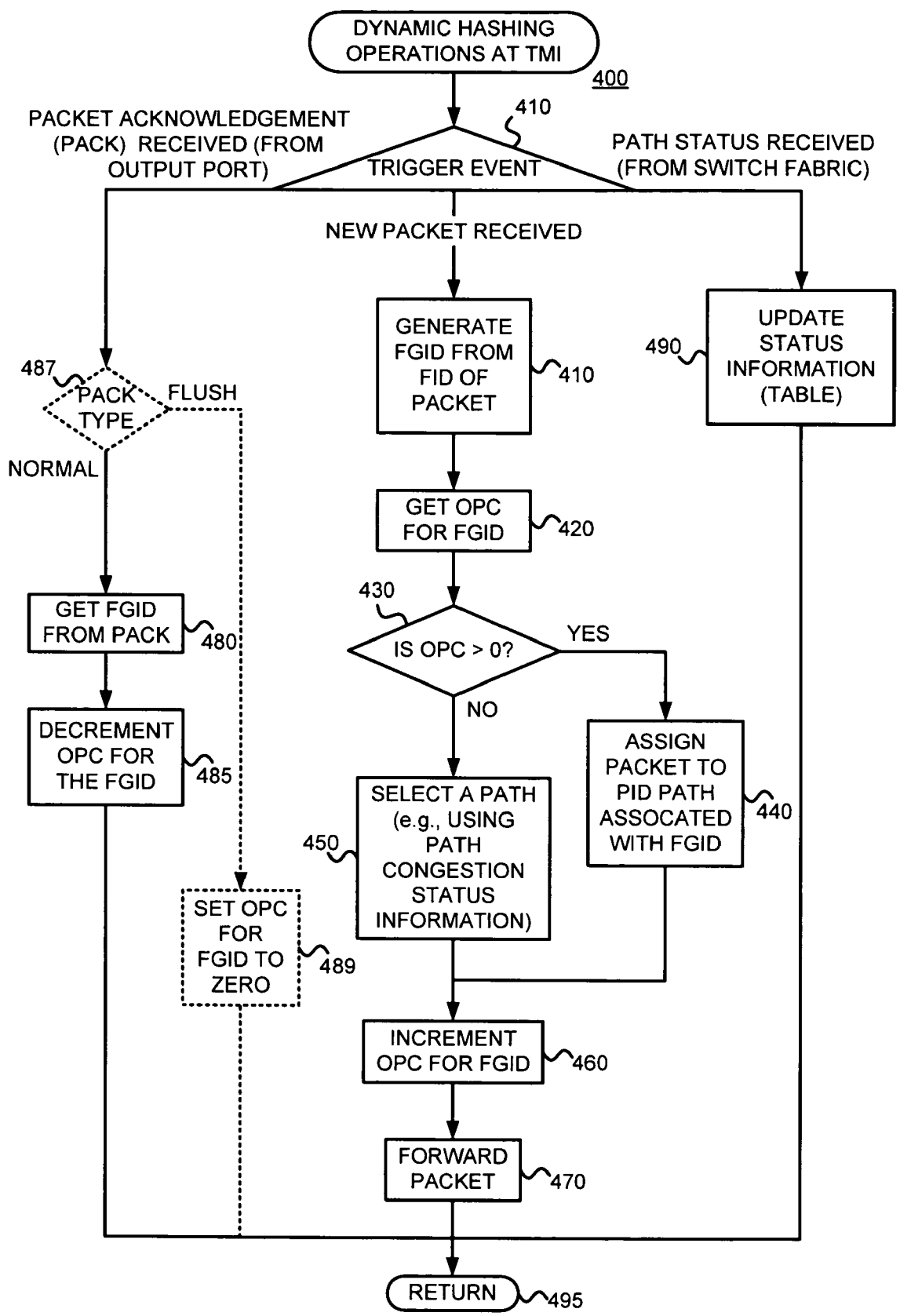
FIG. 4 is a flow diagram of an exemplary method 400 that may be used to perform dynamic hashing operations, in a manner consistent with the present invention, at an ingress traffic manager module (TMI).

Referring to FIG. 4, the TMI 210 may use exemplary method 400 to perform dynamic hashing. As indicated by trigger event block 410, various branches of the method 400 may be performed in response to the occurrence of various conditions. If a new packet is received, a first branch of the method 400 is performed. In this first branch, an FGID may be generated from the FID of the packet as indicated by block 410. The OPC for the FGID is obtained as indicated by block 420. Referring back to FIG. 3B, this association of an OPC 324 to a given FGID 322 may be stored in a distribution table 320'. Then, it is determined whether or not the flow group already has any packets still in the switch fabric. For example, it may be determined if the OPC of the FGID is greater than 0 as indicated by decision block 430. If so, the packet is assigned to the path to which the FGID is already assigned, as indicated by block 440. Referring back to FIG. 3B, this association of a FGID 322 to a PID 326 may be stored in a distribution table 320'. If the OPC of the FGID is equal to zero, a path is selected as indicated by block 450. The selection may use path congestion status information. Recall from FIG. 3C that path status information may be stored in a status table 330'. In one embodiment, the TMI 210 may choose a (non-failed) path among the paths whose congestion flag is set to 0. Exemplary methods for selecting a path are described later with reference to FIG. 5. Regardless of the path used, the OPC for the FGID may be incremented (Block 460), and the packet is forwarded over the selected path (Block 470) before the method 400 is left (Node 495).

Referring once again to trigger event block 410, if a packet acknowledgement (PACK) is received (e.g., from an output port), the FGID may be determined from the PACK as (Block 480), and the OPC for the FGID may be decremented (Block 485) before the method 400 is left (Node 495). Referring back to FIG. 3B, the OPC 324 associated with the FGID 322 in table 320' may be decremented.

Referring once again to trigger event block 410, if path status information is received (e.g., from the switch fabric 240), status information may be updated (Block 490) before the method 400 is left (Node 495). For example, referring back to FIG. 3C, failed and/or congestion flags 334/336 for one or more paths may be updated in an exemplary status table 330'. One example of the path congestion indication is to use the outstanding number of cells between TMI and IM. TMI is already maintaining an outstanding cell counter for each path so that the queue in IM does not overflow. The same counter can be used for the path congestion information.

Figure 5:
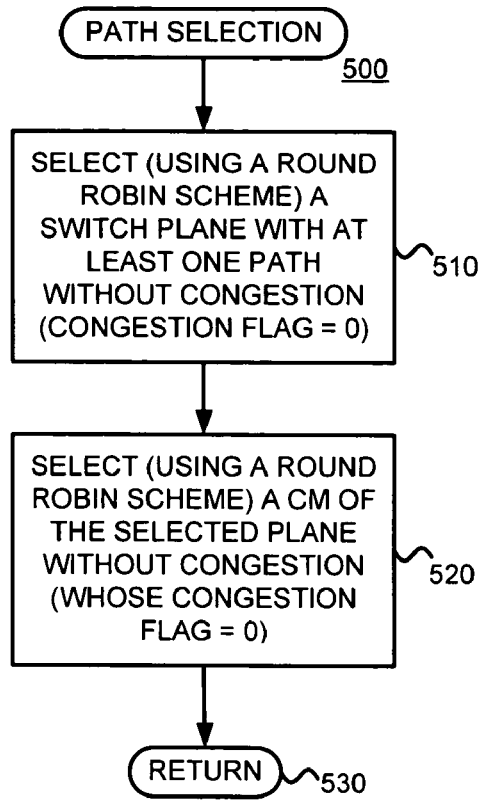
FIG. 5 is a flow diagram of an exemplary method 500 that may be used to select a path in a manner consistent with the present invention.

Referring back to block 450 of FIG. 4, recall that a path is selected. FIG. 5 is a flow diagram of an exemplary method 500 for selecting a functioning, non-congested, path using status table information. As shown, path selection may be performed in two phases. As indicated by block 510, in the first phase, a switch plane 240 having at least one path with no congestion (e.g., whose congestion flag is set to 0). (The fail and congestion flags are not necessarily independent. The fail flag may be checked first. If the fail flag is set to 1, the path is not selected.) This selection may be performed in a round-robin manner. As indicated by block 520, in the second phase, a CM 244 without congestion (e.g., whose congestion flag is equal to 0) is selected. This selection may also be performed in a round-robin manner. If the congestion flag is equal to 1, the path is considered congested. If it is equal to 0, the path is considered un-congested. If all congestion flags are equal to 0, an arbiter may choose one path in a round-robin manner among the m CMs.

Using the method 400, packets of the same flow group may be permitted to take different paths provided that all of the previous packets of the flow group have left the switch fabric, in which case OPC will be zero. This offers better load-balancing than static hashing because the TMI 210 can assign packets of the same flow to less congested paths. The static hashing scheme must assign packets to the pre-determined path even if the path is congested.

If a multicast flow arrives, the OPC should represent all copies of the multicast packet. For example, if the multicast packet is sent to ten TMEs, the OPC should be increased by ten. Since each TME sends one PACK, the OPC will be greater than 0 until all TMEs send PACKs.

Figure 6:
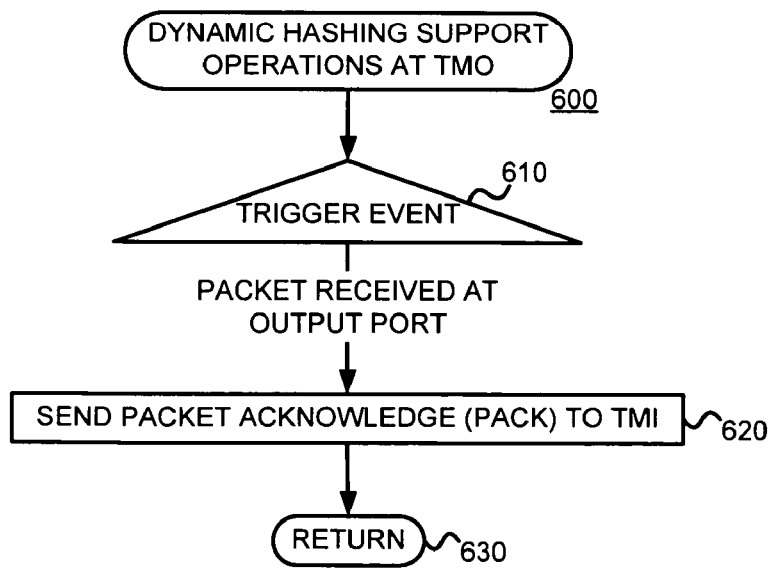
FIG. 6 is a flow diagram of an exemplary method 600 that may be used to perform dynamic hashing support operations, in a manner consistent with the present invention, at an egress traffic manager module (TME).

FIG. 6 is a flow diagram of an exemplary method 600 that may be used to perform dynamic hashing support operations in a manner consistent with the present invention, at an egress traffic manager module (TME). As indicated by trigger event 610 and block 620, if a packet is received at an output port, a PACK is sent to the TMI 210 that sourced the packet (referred to as "the originating TMI"), before the method 600 is left (Node 63).

Referring to block 620 of FIG. 6, one challenge of performing dynamic hashing is sending PACKs from TMEs 220 to TMIs 210. In one embodiment of the present invention, each TME 220 can receive up to p (where p=8 for example) complete packets in a time slot because there are p switch planes 240. When the last cell of a packet arrives, the TME 220 may generate a PACK and send it to the originating TMI in a cell header. Since the PACKs don't need to be delivered in a particular order, each PACK may take any path back to the originating TMI 210.

As Table 1 shows, an exemplary PACK may include a PACK mode field (1-bit), a FLUSH field (1-bit), a TMI address field (12-bits), and a FGID field (16-bits). The value for the TMI address field may be extracted from the cell header of the packet received and the value for the FGID field may be extracted from the packet header, which is in the cell payload. The cell header carries the TMI address but not the FGID.

TABLE 1

| Packet PACK format | | |
|---|---|---|
| FIELD NAME | BIT | DESCRIPTION |
| AMODE | 1 | PACK mode. 0: idle PACK, 1: valid PACK |
| FLUSH | 1 | Flush packet acknowledgement, 0: Normal, 1: Flush |
| TMIA | 12 | TMI Address |
| FGID | 16 | Flow Group ID |
| Total | 30 | |

Figure 7:
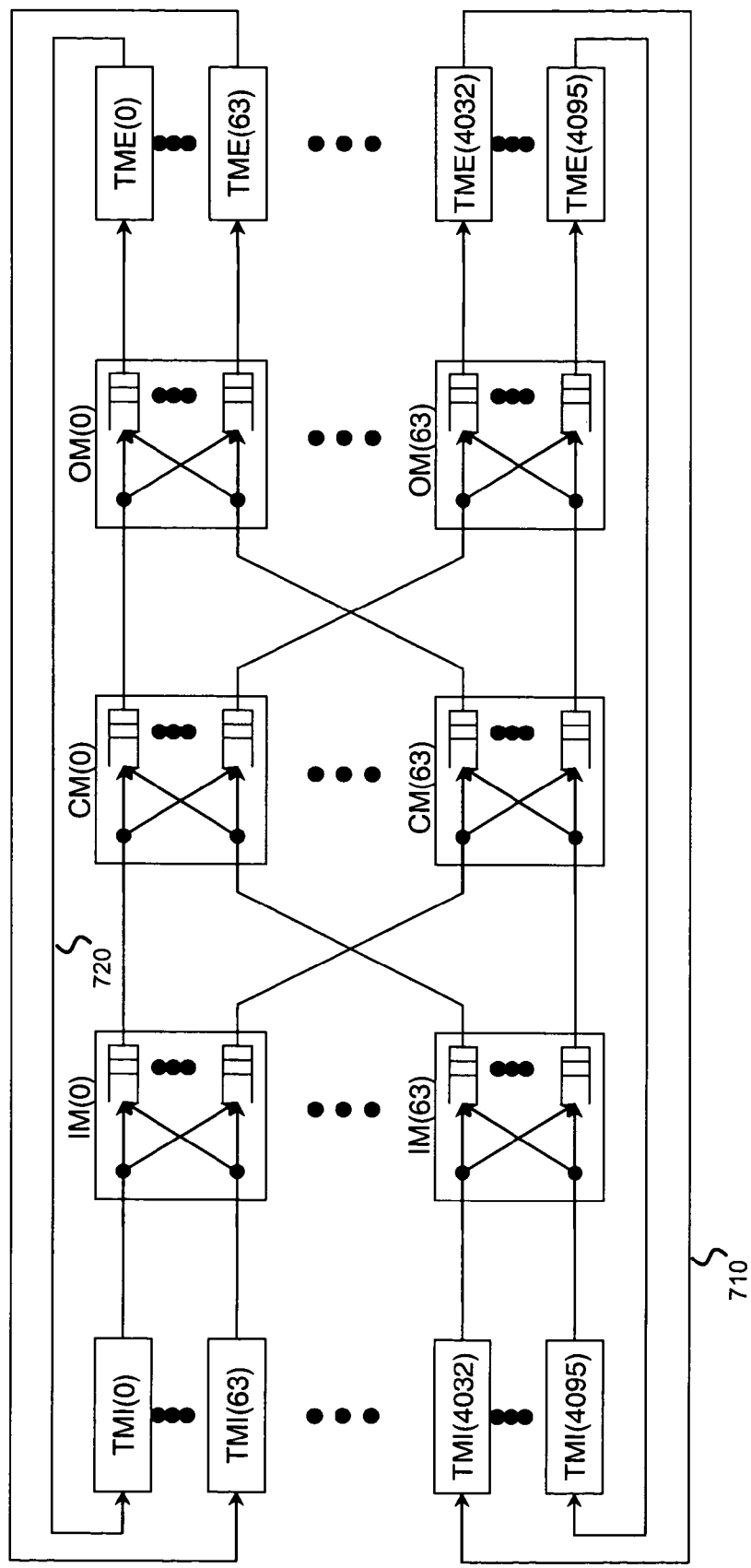
FIG. 7 illustrates packet acknowledgement that may be used with a dynamic hashing operations in a manner consistent with the present invention.

The PACK can be delivered in a cell header. Since it may require 30 bits, it can be accommodated in the cell header. Each TME may be linked with its corresponding TMI as illustrated in FIG. 7. The TME sends the PACK to its corresponding TMI. That TMI then sends the PACK to the switch fabric 230 using the cell header. The PACK should arrive at the TME corresponding to the originating TMI. The TME then sends the PACK back to the originating TMI. Since one TMI 210 can send p cells in a time slot, each TME 220 can send up p PACKs in a time slot.

The TME and TMI do not need to store the PACK since it may be processed as soon as it arrives. The IM, CM, and OM may be provided with output buffers for the PACK because the PACK does not implement a flow control like the data cells. For the data cells, the IM, CM, and OM may have input buffers because it is easier to implement flow control when input buffers are used instead of output buffers. The CM and OM may store the PACK according to the PACK's destination TMI. However, the IM is free to choose any CM.

Referring, for example, to FIG. 7, suppose TMI(0) sends a packet to TME(4032). When TMI(0) sends the last cell of the packet to TME(4032), it increments the outstanding packet counter (OPC) associated with the FGID of the packet by one. When TME(4032) receives the last cell of the packet, it creates a PACK, and passes it to TMI(4032) via link 710. Note that the link 710 is a direct link from a given TME to its corresponding TMI. TMI(4032) then sends the PACK to IM(63). IM(63) chooses one of the 64 CMs (e.g., CM(0)) for the PACK and may store it at an output buffer. FIFO output buffers may be provided at the IM, CM, and OM. Therefore, if the buffer is not empty, it sends one PACK in each cell slot. CM(0) receives the PACK and stores it at the FIFO destined for OM(0) because the PACK is destined for TMI(0). OM(0) receives the PACK and stores it at the FIFO destined for TME(0) because the PACK is destined for TMI(0). TME(0) receives the PACK and passes it to TMI(0) via direct link 720. TMI(0) receives the PACK and decrements the OPC corresponding to the FGID by one.

Since the PACK FIFO buffers at the IM, CM, and OM have a finite size, a PACK can be discarded due to the buffer overflow. This should be accounted for. Otherwise, the TMI would always assume that a flow group had packets in the switch fabric because the OPC of the FGID would never get back down to zero. In order to recover from an erroneous state in the event a lost PACK, the TMI may send a flush packet if the OPC is non-zero for a long time. This will flush the packets in the switch fabric. If a flush packet is sent, the packets with the corresponding FGID are held at the TMI until the flush packet is acknowledged. If the flush PACK is received, the TMI resets the OPC for the FGID. (See, e.g., decision block 487 and block 489 of FIG. 4.) The TMI can then choose a new path for any packets with the FGID. To distinguish the flushed PACK from other PACKs, one more bit in the cell header may be used.

In one embodiment of the invention, in a worst case, each TME receives p PACKs and sends p PACKs in a cell time slot. The PACK will not become backlogged in the switch fabric unless more than p PACKs are destined for the same TMI. Since each TMI can receive up to p PACKs per time slot, there can be contention in the switch fabric if more than p PACKs are destined for the same TMI.

The PID is valid of a given FGID while the OPC is greater than zero. If the OPC reaches zero, a new PID may be assigned to the FGID. This is because if the OPC becomes zero, the FGID can be assigned to a path different from the previous path without having a packet out-of-sequence problem. By allowing packets of a flow to take a path different from a previous path used by the flow if the OPC is equal to zero, congestion can be avoided or alleviated. This scheme also achieves better load-balancing than static hashing because the TMI can assign packets of the same flow to less congested paths (if the OPC is zero). In contrast, the static hashing scheme must assign packets to the pre-determined path even if the path is congested.

§4.2.1.1 Performance of Dynamic Hashing

Figure 8:
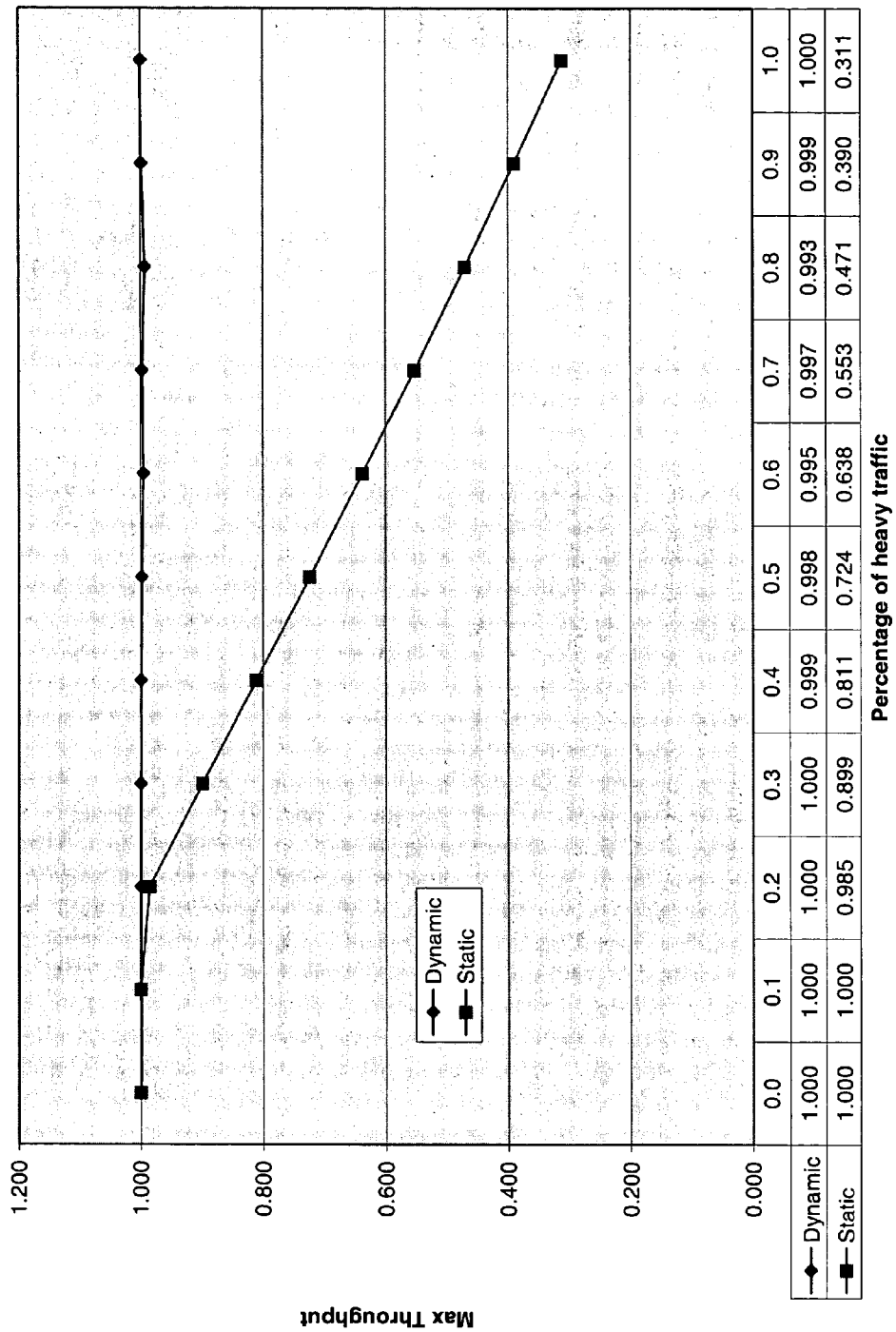
FIG. 8 illustrates throughput performance of an embodiment of a dynamic hashing technique that is consistent with the present invention.

The flow bandwidth of Internet traffic has a large variation. Some flows are a few Kbps while some flows are a few hundreds Mbps. Assume that the port speed is 10 Gbps, the number of light flows is 100,000, and the number of heavy flows is 10. Let v be the percentage of the heavy traffic. If v=0.0, then all flows have the same bandwidth and the flow bandwidth is 100 Kbps. If v=0.5, the heavy flows have a bandwidth of 500 Mbps while the light flows have a bandwidth of 50 Kbps. If v=1.0, all flows will have the same bandwidth, 1 Gbps. FIG. 8 shows the impact of flow bandwidth variation on the system throughput for static hashing and the dynamic hashing.

Routing by dynamic hashing is suitable for a large scale system because it eliminates re-sequencing at the output port and distributes packets among the multiple paths more evenly. The dynamic hashing techniques of the present invention are more attractive than techniques that use re-sequencing because the high-speed input port may have hundreds of thousands flows and the number of paths is only a few hundred.

§4.2.2 HOL Blocking Mitigation Using VOQs

Figure 9:
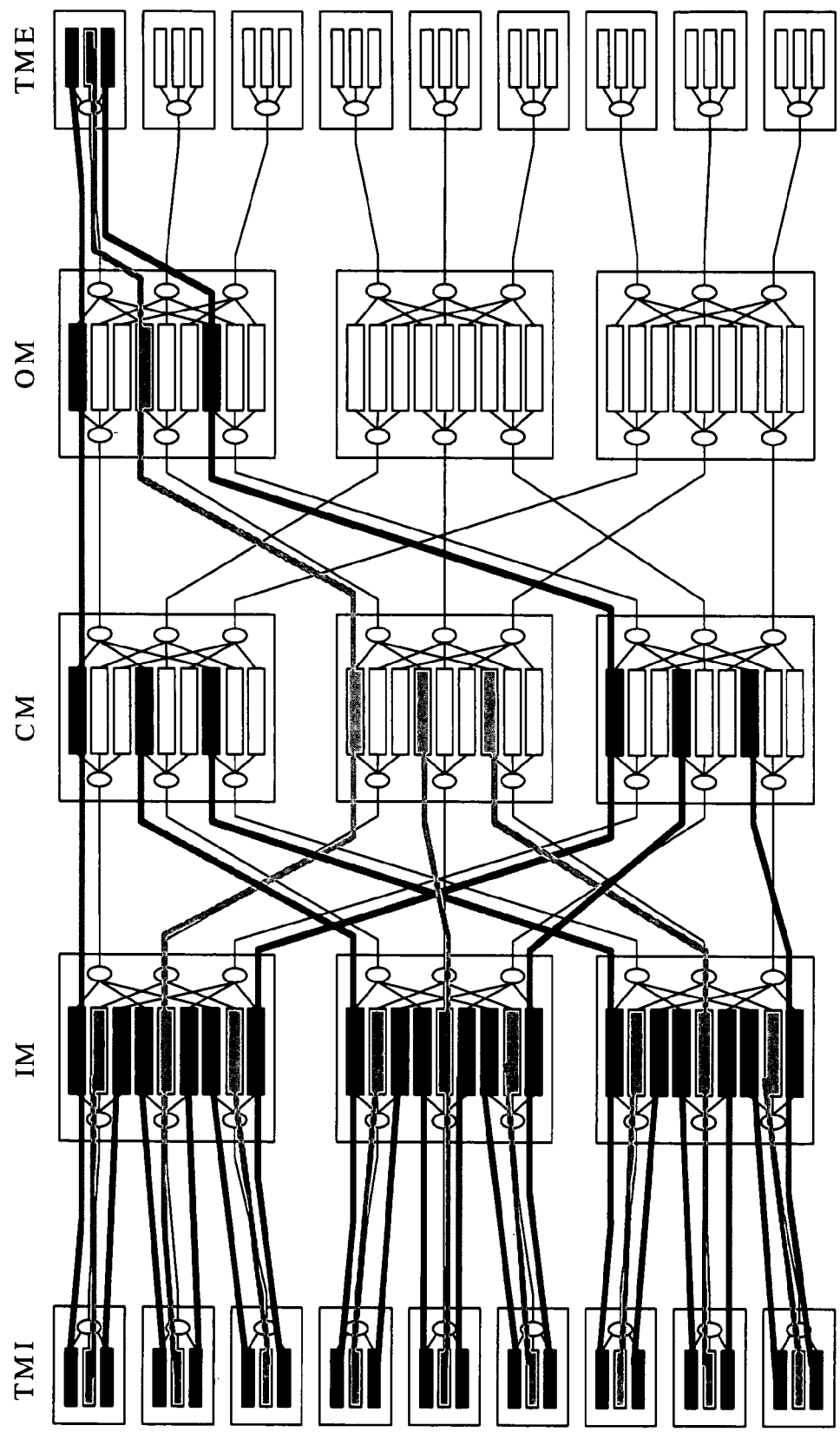
FIG. 9 illustrates a problem of HOL blocking that may occur with a VPQ structure.

Especially in the case of a hot-spot TME, throughput can drop to 1/N. For example, if N is 4096, the throughput becomes 0.0002. This can be explained as follows. Assume that 10% of all traffic is destined for the hot-spot TME. When this traffic destined for the hot-spot TME arrive at various CMs, the flows (or cells) of the traffic will contend with each other. Only one cell wins the contention and the other cells remain at the HOL of the queues. The same situation can happen at the IM. If HOL cells at all queues of IM are destined for the hot-spot TME, HOL cells losing contention will block all other traffic destined for idle TMEs. This can drop the throughput of the switch fabric significantly. This situation is illustrated in FIG. 9. If all HOL cells at the IM are destined for the hot-spot TME, all the cells destined for other idle TMEs cannot be forwarded because they are behind the HOL cells at the IM. Thus, the throughput of the non-hot-spot TMEs becomes 0.

Figure 10:
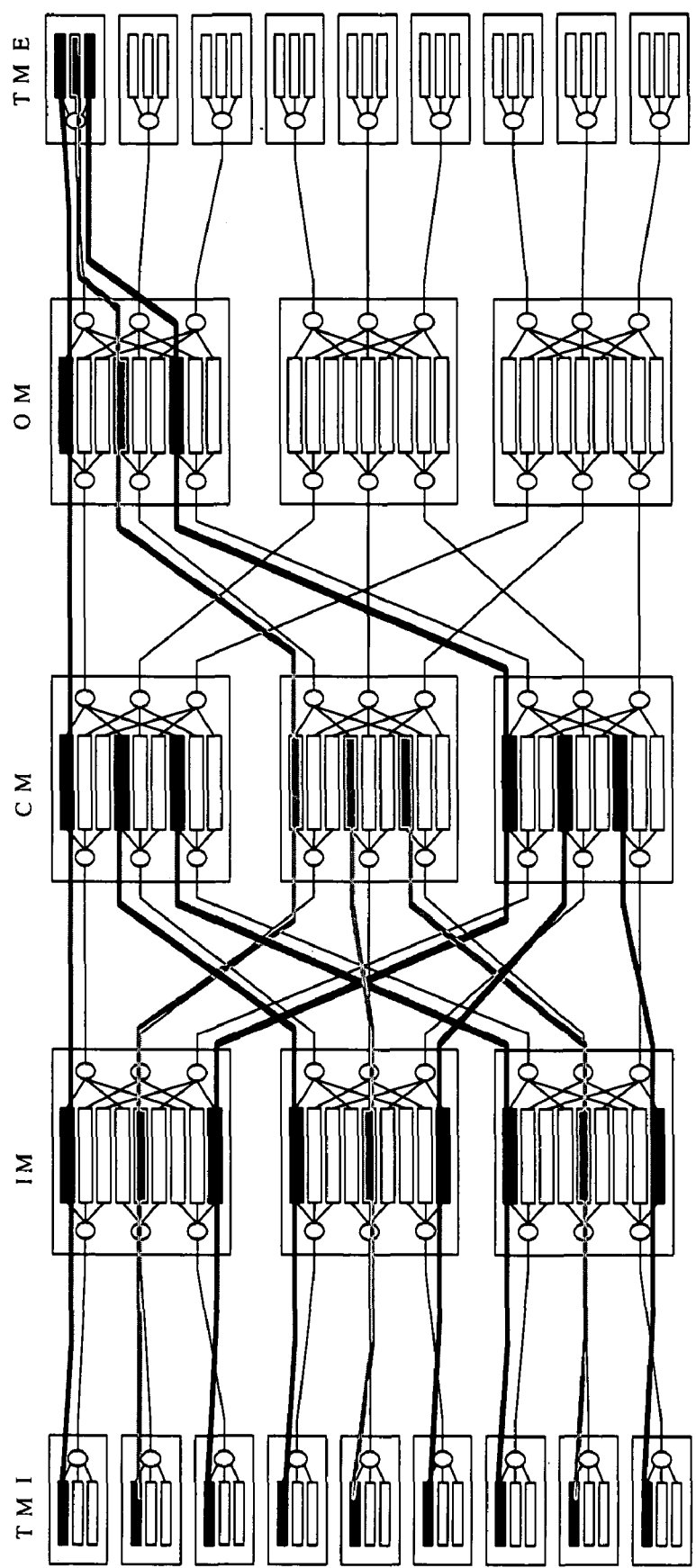
FIG. 10 illustrates a hot spot traffic problem that may occur with a VOQ structure.

If it is assumed that each cross-point at each IM, CM and OM has only q queues, and that TMI has only q*n*k queues (i.e., a VOQ structure), the hot-spot VOQ can send only one packet at a time. Therefore, only a few destination queues (DQs) at the IM can be occupied by the hot-spot traffic and the other space can be occupied by the non-hot-spot traffic, as shown in FIG. 10. This improves the throughput performance of the non-hot-spot traffic. However, if two VOQs are sending cells to the same queue at IM, the two packets can be interleaved with each other.

If a TMI buffer has p*q*m*n*k queues, the number of queues may be too big to implement practically.

The present invention may mitigate HOL blocking at the input port of the multi-plane multi-stage switch fabric by providing virtual path queues (VPQs) of HOL packets of virtual output queues (VOQs). That is, in some embodiments of the present invention, the input port has two stages of queues. At the first stage, the packets may be stored at the VOQs. The HOL packet of each VOQ may be sent to the VPQ. The number of VPQs may be equal to the number of paths in the switch fabric, multiplied by the number of scheduling priorities. Since each VOQ can send at most one packet to the VPQ, the total number of packets at all VPQs should be equal to or less than the number of VOQs. Therefore, the first stage buffer may have q*n*k queues corresponding to each TME (i.e., virtual output queue (VOQ)) and the second stage buffer may have q*p*m queues corresponding to each path (i.e., virtual path queue (VPQ)). By using the VOQ and VPQ together, HOL blocking can be minimized. If the VOQ becomes full, packets may be discarded according to some scheme, such as a weighted random early discard (WRED) algorithm for example, at the VOQ. A switch consistent with the present invention may implement WRED at two points—at the VOQ at TMI, and at the class of service queue (COSQ) at TME).

Figure 11:
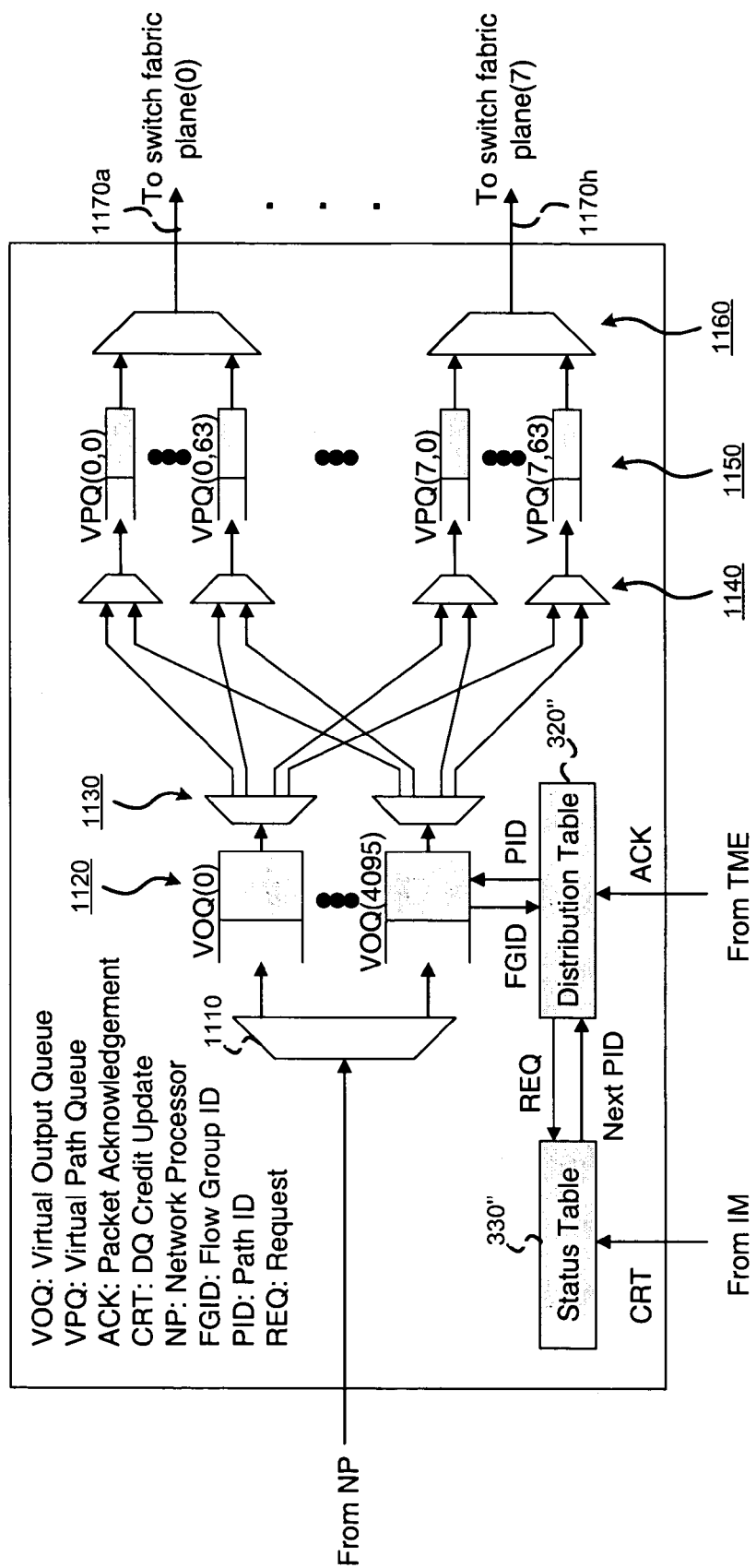
FIG. 11 illustrates an exemplary TMI that may be used to perform two-stage virtual queuing in a manner consistent with the present invention.

FIG. 11 illustrates an exemplary TMI 1100 that may be used to perform two-stage virtual output queuing in a manner consistent with the present invention. As shown, the exemplary TMI 1100 may include a demultiplexer (DEMUX) 1110, VOQs 1120, DEMUXs 1130, multiplexers (MUXs) 1140, VPQs 1150, and multiplexers (MUXs) 1160. Each of the MUXs 1140 and 1160 may be thought of as arbiters. The TMI 1100 may also include a distribution table 320" and a status table 330", such as those described in §4.2.1 above with reference to FIG. 3. Each of the VOQs 1120 may correspond to an associated output port. Each of the VPQs 1150 may correspond to an associated path, where the path is defined by the switch plane and the CM. In one embodiment of the present invention including eight (8) switch fabric planes, each plane having 64 CMs, 512 VPQs may be provided at each TMI 1100.

Figure 12:
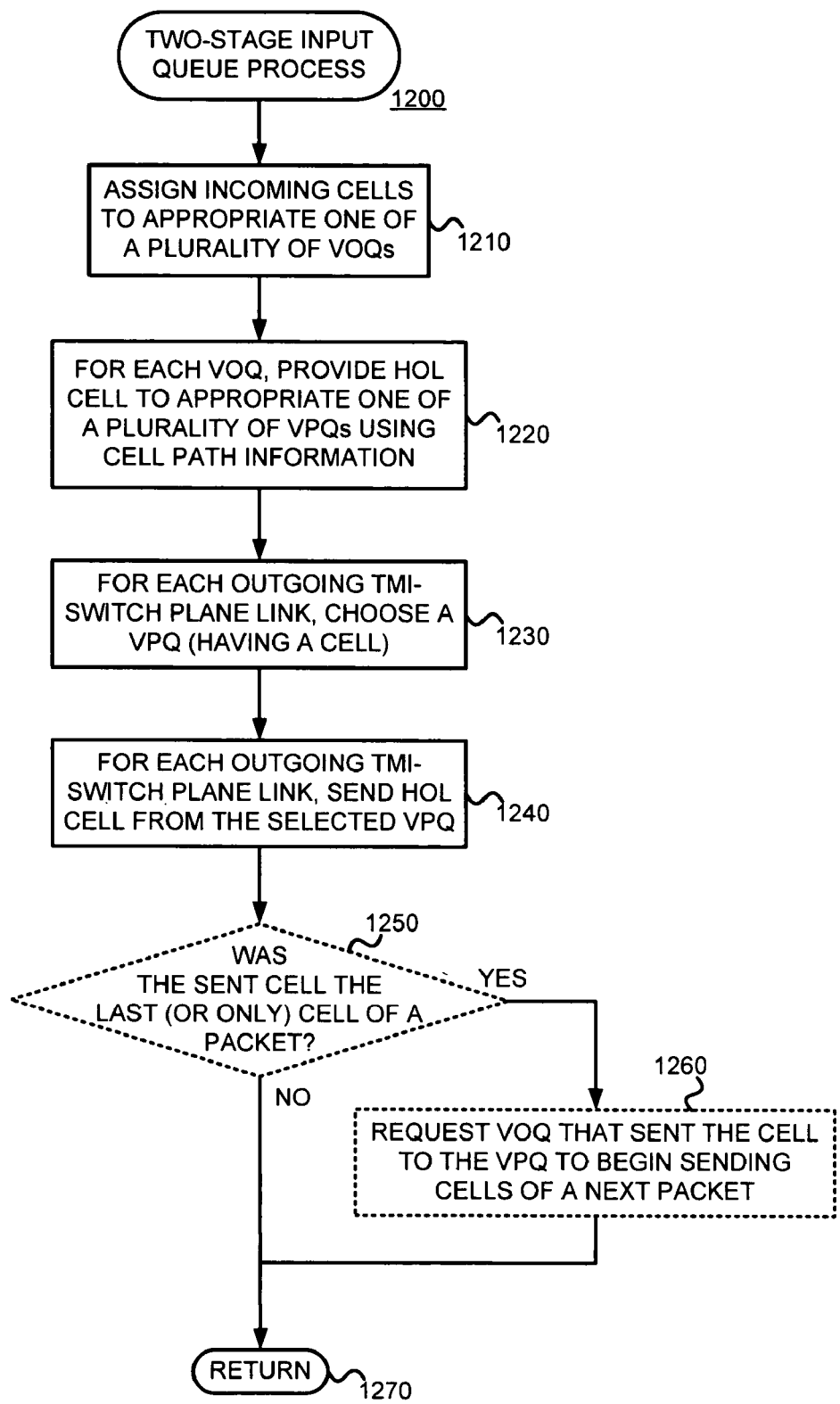
FIG. 12 is a flow diagram of an exemplary method 1200 that may be used to perform two-stage queuing, in a manner consistent with the present invention, at a TMI.

FIG. 12 is a flow diagram of an exemplary method 1200 that may be used to perform two-stage queuing, in a manner consistent with the present invention, at a TMI. An instance of the method 1200 may be performed at each TMI 1100. Recall that when a packet arrives (e.g., from a network processor (NP)), the packet may be segmented into cells. As indicated by block 1210, incoming cells are each assigned to an appropriate one of the VOQs 1120. The DEMUX 1110 may do this using a destination output port associated with each cell. As indicated by block 1220, for each of the VOQs 1120, the HOL packet is moved to an appropriate one of the VPQs 1140. For example, the VPQ 1140 may be associated with the PID of the packet. An exemplary procedure for determining a PID was described in §4.2.1 above. Information in the distribution table 320" may be used for this purpose. The PID may include the plane number and the CM number. Once the PID is determined, it may be attached to the cell header. As indicated by block 1230, for each TMI-switch plane link 1170 of the TMI 1100, a VPQ 1150 is selected. This selection may use the scheduling scheme described in §4.2.1 above. Information in the status table 330" may be used for this purpose. As indicated by block 1240, for each TMI-switch plane link 1170 of the TMI 1100, a HOL cell from the selected VPQ 1150 is sent to the IM of the switch plane over the link 1170.

In the exemplary method 1200, the sum of all packets in all VPQs 1150 is equal to or smaller than N. When the VPQ 1150 sends the last cell of a packet (i.e., EOP cell or SCP cell), the VPQ 1150 informs the VOQ 1120. Then the VOQ 1120 sends the next packet to one of the non-congested VPQ 1150, which doesn't need to be the same VPQ as the previous one. This is illustrated in blocks 1250 and 1260 of FIG. 12.

§4.2.2.1 Performance of VOQ for HOL Blocking Mitigation

The destinations of packets coming to the switch are assumed to be independent of each other. Therefore, it is possible that a large portion of the traffic is destined for the same TME at the same time. The destination of a packet is determined by the non-uniform parameter u. If u=0.0, the destination is uniform over all the TMES. If u=1.0, the destination is fixed to one hot-spot TME. If u is between 0.0 and 1.0, u % of the traffic has a fixed destination to one hot-spot TME and the other (1-u)*100% of the traffic is uniformly distributed over all the TMEs.

For instance, 50% of the traffic can be destined for one hot-spot TME. In this case, the other 50% of the traffic should be able to reach their TME. Output-buffered switches can achieve this goal, but the input-buffered switches may not be able to achieve this goal because of HOL blocking in the system.

Figure 13:
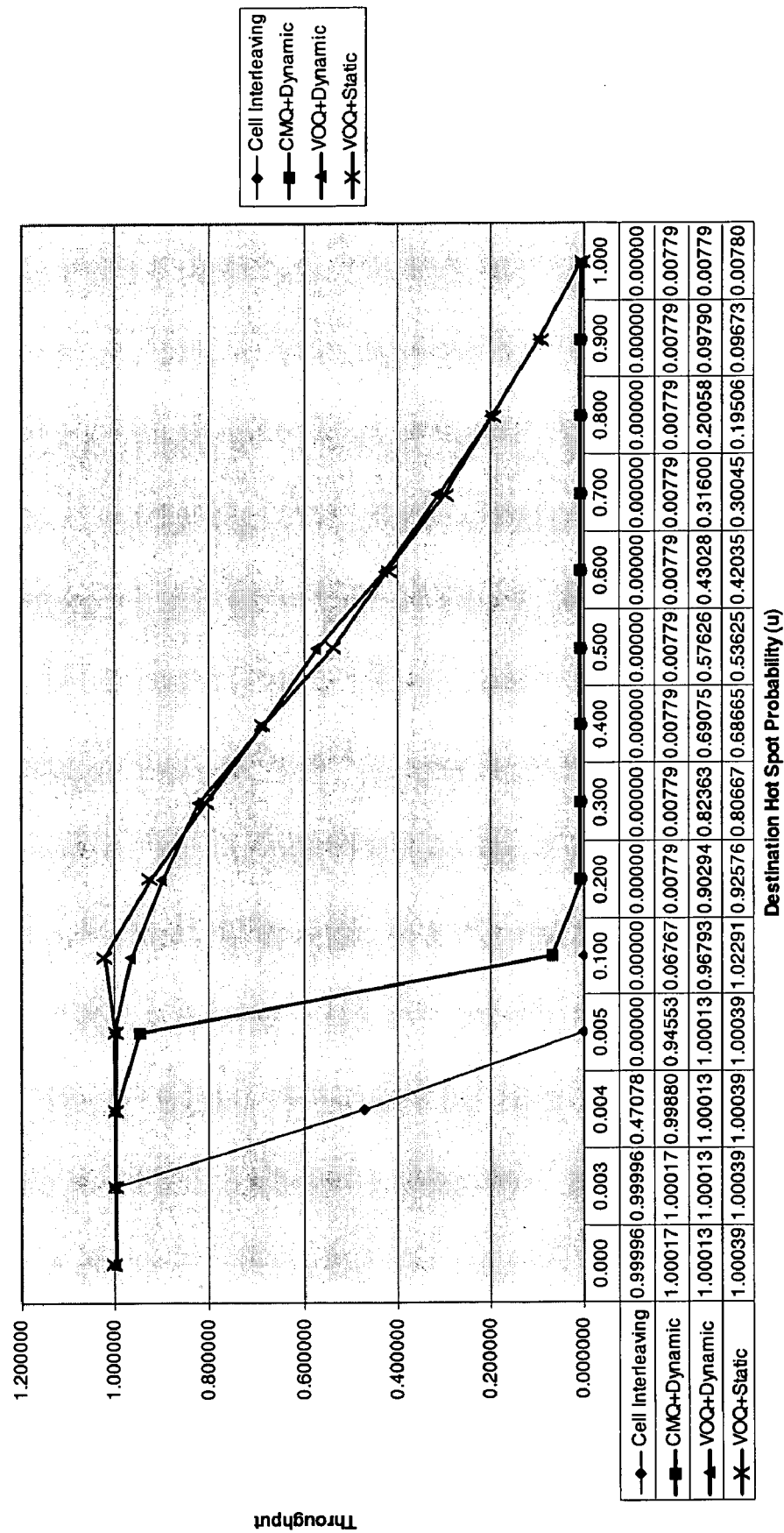
FIG. 13 illustrates throughput performance of various queuing techniques.

FIG. 13 shows the maximum throughput versus the non-uniform parameter u for various buffering and scheduling schemes. A cell-interleaving scheme may fail under hot-spot traffic as shown in FIG. 13. A packet-interleaving scheme (such as those described in the '733 provisional) with VPQ structure in the TMI is better than the cell-interleaving scheme but still does not perform very well. The packet-interleaving scheme (with either dynamic hashing or static hashing) with two-stage queue structure in the TMI performs better, as shown in FIG. 13.

§4.3 Alternatives

The foregoing description of embodiments consistent with the present invention provides illustration and description, but is not intended to be exhaustive or to limit the invention to the precise embodiments disclosed. Modifications and variations are possible in light of the above teachings or may be acquired from practice of the invention. For example, although a series of acts may have been described with reference to a flow diagram, the order of acts may differ in other implementations when the performance of one act is not dependent on the completion of another act. Further, non-dependent acts may be performed in parallel. As another example, although some elements of the invention were described as hardware elements, various operations of the invention may be performed with other means, such as software, hardware (general purpose or application specific), or both.

What is claimed is:

1. A method implemented in a communication switch comprising:
    accepting a packet associated with a flow;
    generating a flow group identifier from the flow;
    determining whether other packets associated with the flow group are present in a switch fabric;
    assigning the packet to a path being used by the flow group if other packets associated with the flow group are present in the switch fabric; and
    assigning the packet to a path using path congestion status information if other packets associated with the flow group are not present in the switch fabric.

2. The method of claim 1 wherein generating a flow group identifier from the flow comprises hashing a flow identifier.

3. The method of claim 1 wherein determining whether any other packets associated with the flow group are present in a switch fabric comprises maintaining an outstanding packet counter.

4. The method of claim 3 wherein the outstanding packet counter is associated with the flow group identifier.

5. The method of claim 4 wherein maintaining an outstanding packet counter comprises incrementing the outstanding packet counter each time a packet belonging to the flow group is sent into the switch fabric, and decrementing the outstanding packet counter each time a packet belonging to the flow group leaves the switch fabric.

6. The method of claim 5 wherein decrementing the outstanding packet counter is performed in response to a message from an output port.

7. The method of claim 6 further comprising:
    transmitting the message from the output port to a corresponding input element,
    transmitting the message from the corresponding input element, through the switch fabric, to an output element, and
    transmitting the message from the output element to another input element corresponding to the output element, wherein the other input element originated the packet.

8. The method of claim 3 wherein maintaining the outstanding packet counter comprises resetting the outstanding packet counter if it remains non-zero for more than a predetermined period of time.

9. The method of claim 1 wherein assigning the packet to a path using path using path congestion status information comprises:
- selecting a switch plane having at least one uncongested path, and
- selecting an uncongested path of the selected switch plane.

10. The method of claim 9 wherein selecting a switch plane having at least one uncongested path is performed using a round robin discipline.

11. The method of claim 9 wherein selecting an uncongested path of the selected switch plane is performed using a round robin discipline.

12. A method implemented in a communication switch comprising:
- accepting a packet associated with a flow;
- generating a flow group identifier from the flow;
- storing a first data structure in a switch fabric, the first data structure comprising a first entry, the first entry comprising the flow group identifier, an outstanding packet indicator, and a path identifier; and
- storing a second data structure in the switch fabric, the second data structure comprising a second entry, the second entry comprising the path identifier and path status information, wherein the path status information comprises an indication of whether a path failed and an indication of whether the path is congested.

13. An apparatus comprising:
- means for accepting a packet associated with a flow;
- means for generating a flow group identifier from the flow;
- means for determining whether other packets associated with the flow group are present in a switch fabric;
- means for assigning the packet to a path being used by the flow group if other packets associated with the flow group are present in the switch fabric; and
- means for assigning the packet to a path using path congestion status information if other packets associated with the flow group are not present in the switch fabric.

14. The apparatus of claim 13 wherein the means for generating a flow group identifier from the flow comprises means for hashing a flow identifier.

15. The apparatus of claim 13 wherein the means for determining whether any other packets associated with the flow group are present in a switch fabric comprises means for updating an outstanding packet counter.

16. The apparatus of claim 15 wherein the outstanding packet counter is associated with the flow group identifier.

17. The apparatus of claim 16 wherein the means for updating an outstanding packet counter comprises means for incrementing the outstanding packet counter each time a packet belonging to the flow group is sent into the switch fabric, and decrementing the outstanding packet counter each time a packet belonging to the flow group leaves the switch fabric.

18. The apparatus of claim 17 wherein the outstanding packet counter is decremented in response to a message from an output port.

19. The apparatus of claim 18 further comprising:
- means for transmitting the message from the output port to a corresponding input element,
- means for transmitting the message from the corresponding input element, through the switch fabric, to an output element, and
- means for transmitting the message from the output element to another input element corresponding to the output element, wherein the other input element originated the packet.

20. The apparatus of claim 15 wherein the outstanding packet counter is reset if the outstanding packet counter remains non-zero for more than a predetermined period of time.

21. The apparatus of claim 13 wherein the means for assigning the packet to a path using path congestion status information comprises:
- means for selecting a switch plane having at least one uncongested path, and
- means for selecting an uncongested path of the selected switch plane.

22. The apparatus of claim 21 wherein the means for selecting a switch plane having at least one uncongested path uses a round robin discipline.

23. The apparatus of claim 22 wherein the means for selecting an uncongested path of the selected switch plane uses a round robin discipline.

24. A method for alleviating head-of-line blocking implemented in an input-buffered switch, wherein the switch comprises an input module, the input module including virtual output queues and virtual path queues, the method comprising:
- assigning an incoming cell to one of the virtual output queues using cell destination information;
- providing a head-of-line cell of the one of the virtual output queues to one of the virtual path queues using a dynamic hashing scheme;
- selecting, for a switch plane link, one of a number of virtual path queues having a cell; and
- sending the cell from the selected one of the number of virtual path queues over the switch plane link.

25. The method of claim 24 further comprising:
- determining whether the cell sent over the link is the last cell of a packet; and
- sending another cell associated with another packet to one of the virtual path queues if the cell sent over the link is the last cell of the packet.

26. An input module implemented in a switch, the input module comprising:
- a plurality of virtual output queues for accepting cells based on cell destination information; and
- a plurality of virtual path queues for accepting head-of-line cells from the plurality of virtual output queues, wherein each of the virtual path queues accepts a head-of line cell from a virtual output queue based on a dynamic hashing scheme.

27. The input module of claim 26 wherein the number of the plurality of virtual output queues equals a number of output ports of the switch.

28. The input module of claim 26 wherein the number of the plurality of virtual path queues equals a number of paths through a switch fabric of the switch.

29. The input module of claim 26 wherein the number of the plurality of virtual path queues equals the number of switch planes of a switch fabric of the switch multiplied by the number of paths through each of the switch planes.

30. A communication switch for multicasting a packet, the communication switch comprising:
- a switch fabric; and
- a traffic manager module configured to:
  - generate a flow group identifier from a flow;
  - determine whether other packets associated with the flow group are present in the switch fabric;

assign the packet to a path being used by the flow group if other packets associated with the flow group are present in the switch fabric; and assign the packet to a path using path congestion status information if other packets associated with the flow group are not present in the switch fabric.

31. The communication switch of claim 30 wherein the traffic manager module is configured to generate a flow group identifier from the flow by using a hash of a flow identifier.

32. The communication switch of claim 30 wherein the traffic manager module is configured to determine whether any other packets associated with the flow group are present in a switch fabric by using an outstanding packet counter.

33. The communication switch of claim 32 wherein the outstanding packet counter is associated with the flow group identifier.

34. The communication switch of claim 33 wherein the traffic manager module is configured to increment the outstanding packet counter each time a packet belonging to the flow group is sent into the switch fabric, and decrement the outstanding packet counter each time a packet belonging to the flow group leaves the switch fabric.

35. The communication switch of claim 34 wherein the outstanding packet counter is decremented in response to a message from an output port.

36. The communication switch of claim 35 wherein the traffic manager module is further configured to:

transmit the message from the output port to a corresponding input element, transmit the message from the corresponding input element, through the switch fabric, to an output element, and transmit the message from the output element to another input element corresponding to the output element, wherein the other input element originated the packet.

37. The communication switch of claim 32 wherein the outstanding packet counter is reset if the outstanding packet counter remains non-zero for more than a predetermined period of time.

38. The communication switch of claim 30 wherein the traffic manager module is configured to assign the packet to a path using path congestion status information by:

selecting a switch plane having at least one uncongested path, and selecting an uncongested path of the selected switch plane.

39. The communication switch of claim 38 wherein the traffic manager module is configured to use a round robin discipline to select at least one of the switch plane and the uncongested path.

* * * * *

UNITED STATES PATENT AND TRADEMARK OFFICE
CERTIFICATE OF CORRECTION

PATENT NO. : 7,894,343 B2  Page 1 of 1
APPLICATION NO. : 10/776574
DATED : February 22, 2011
INVENTOR(S) : Chao et al.

It is certified that error appears in the above-identified patent and that said Letters Patent is hereby corrected as shown below:

Column 17, line 2, in Claim 9, delete "using path using path" and insert -- using path --.

Column 18, line 47, in Claim 26, delete "head-of line" and insert -- head-of-line --.

Signed and Sealed this
Twenty-eighth Day of June, 2011

David J. Kappos
*Director of the United States Patent and Trademark Office*